United States Patent
Rosenberg et al.

(10) Patent No.: US 6,750,877 B2
(45) Date of Patent: Jun. 15, 2004

(54) CONTROLLING HAPTIC FEEDBACK FOR ENHANCING NAVIGATION IN A GRAPHICAL ENVIRONMENT

(75) Inventors: Louis B. Rosenberg, San Jose, CA (US); Matthew Mather, Montreal (CA); Danny Grant, Montreal (CA); Christophe Ramstein, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 10/051,756

(22) Filed: Jan. 16, 2002

(65) Prior Publication Data

US 2002/0109668 A1 Aug. 15, 2002

Related U.S. Application Data

(63) Continuation-in-part of application No. 09/756,617, filed on Jan. 8, 2001, which is a continuation of application No. 08/571,606, filed on Dec. 13, 1995, now Pat. No. 6,219,032, application No. 10/051,756, which is a continuation-in-part of application No. 09/903,209, filed on Jul. 10, 2001, which is a continuation of application No. 09/499,338, filed on Feb. 4, 2000, now Pat. No. 6,259,382, which is a continuation of application No. 09/160,985, filed on Sep. 24, 1998, now Pat. No. 6,232,891, which is a continuation of application No. 08/756,745, filed on Nov. 26, 1996, now Pat. No. 5,825,308, application No. 10/051,756, which is a continuation-in-part of application No. 09/992,123, filed on Nov. 13, 2001, which is a continuation of application No. 09/590,856, filed on Jun. 8, 2000, now Pat. No. 6,317,116, which is a continuation of application No. 08/879,296, filed on Jun. 18, 1997, now Pat. No. 6,078,308, application No. 10/051,756.

(60) Provisional application No. 60/262,286, filed on Jan. 16, 2001.

(51) Int. Cl.$^7$ .............................. G09G 5/00; G09G 5/08
(52) U.S. Cl. ................... 345/701; 345/702; 345/157; 345/856
(58) Field of Search ................... 345/856, 860, 345/862, 156, 157, 161, 163, 701, 702, 863

(56) References Cited

U.S. PATENT DOCUMENTS

| 3,157,853 A | 11/1964 | Hirsch |
| 3,220,121 A | 11/1965 | Cutler |
| 3,497,668 A | 2/1970 | Hirsch |

(List continued on next page.)

FOREIGN PATENT DOCUMENTS

| EP | 0349086 | 1/1990 |
| JP | H2-185278 | 7/1990 |
| JP | H4-8381 | 1/1992 |
| JP | H5-192449 | 8/1993 |
| JP | H7-24147 | 1/1995 |
| WO | WO 02/057885 A3 | 7/2002 |

OTHER PUBLICATIONS

"Taking a Joystick Ride", Computer Currents, Tim Scannell, Nov. 1994, Boston Edition, vol. 9 No. 11.

"Coaxial Control Shaker Part No. C–25502," Safe Flight Instrument Corporation, 26 pages, Jul. 1, 1967; Revised Jan. 28, 2002.

Baigrie, "Electric Control Loading—A Low Cost, High Performance Alternative," Proceedings, pp. 247–254, Nov. 6–8, 1990.

(List continued on next page.)

*Primary Examiner*—Steven Saras
*Assistant Examiner*—Paul A. Bell
(74) *Attorney, Agent, or Firm*—Kilpatrick Stockton LLP

(57) ABSTRACT

Method and apparatus for controlling haptic feedback to enhance navigation of a cursor or other controlled displayed object in a graphical environment. An interface device is capable of communicating with a computer running an application program and generating a graphical environment includes an actuator for outputting a haptic effect to a user of the interface device. A modulator modulates the magnitude of the haptic effect in relation to, in various embodiments, a velocity of the cursor or user manipulatable object; a rate of interaction of the cursor with graphical objects; or an amount of time that the cursor engages the graphical object.

27 Claims, 5 Drawing Sheets

U.S. PATENT DOCUMENTS

| | | | |
|---|---|---|---|
| 3,517,446 | A | 6/1970 | Corlyon et al. |
| 3,902,687 | A | 9/1975 | Hightower |
| 3,903,614 | A | 9/1975 | Diamond et al. |
| 4,160,508 | A | 7/1979 | Frosch et al. |
| 4,236,325 | A | 12/1980 | Hall et al. |
| 4,513,235 | A | 4/1985 | Acklam et al. |
| 4,581,491 | A | 4/1986 | Boothroyd |
| 4,599,070 | A | 7/1986 | Hladky et al. |
| 4,708,656 | A | 11/1987 | De Vries et al. |
| 4,713,007 | A | 12/1987 | Alban |
| 4,891,764 | A | 1/1990 | McIntosh |
| 4,930,770 | A | 6/1990 | Baker |
| 4,934,694 | A | 6/1990 | McIntosh |
| 5,019,761 | A | 5/1991 | Kraft |
| 5,022,407 | A | 6/1991 | Horch et al. |
| 5,035,242 | A | 7/1991 | Franklin |
| 5,038,089 | A | 8/1991 | Szakaly |
| 5,078,152 | A | 1/1992 | Bond |
| 5,186,695 | A | 2/1993 | Mangseth et al. |
| 5,212,473 | A | 5/1993 | Louis |
| 5,240,417 | A | 8/1993 | Smithson et al. |
| 5,271,290 | A | 12/1993 | Fischer |
| 5,275,174 | A | 1/1994 | Cook |
| 5,299,810 | A | 4/1994 | Pierce |
| 5,309,140 | A | 5/1994 | Everett |
| 5,334,027 | A | 8/1994 | Wherlock |
| 5,466,213 | A | 11/1995 | Hogan |
| 5,547,382 | A | 8/1996 | Yamasaki |
| 5,766,016 | A | 6/1998 | Sinclair |
| 5,785,630 | A | 7/1998 | Bobick et al. |
| 5,825,308 | A | 10/1998 | Rosenberg |
| 5,973,670 | A * | 10/1999 | Barber et al. ............... 345/702 |
| 6,046,726 | A * | 4/2000 | Keyson ...................... 345/702 |
| 6,111,577 | A | 8/2000 | Zilles et al. |
| 6,219,034 | B1 * | 4/2001 | Elbing et al. ............... 345/158 |
| 6,422,941 | B1 | 7/2002 | Thorner et al. |

OTHER PUBLICATIONS

Iwata, "Pen–based Haptic Virtual Environment," 0–7803–1363–1/93–IEEE, pp 287–292, 1993.

Russo, "The Design and Implementation of a Three Degree of Freedom Force Output Joystick," MIT Libraries Archives Aug. 14, 1990, pp. 1–131, May 1990.

Brooks et al., "Hand Controllers for Teleoperation—A State–of–the–Art Technology Survey and Evaluation," JPL Publication 85–11; NASA–CR–175890; N85–28559, pp. 1–84, Mar. 1, 1985.

Jones et al., "A perceptual analysis of stiffness," ISSN 0014–4819 Springer International (Springer–Vertag); Experimental Brain Research, vol. 79, No. 1, pp. 150–156, 1990.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25–44, May 2, 1993.

Snow et al., "Model–X–Force–Reflecting–Hand–Controller," NT Control No. MPO–17851; JPL Case No. 5348, pp. 1–4, Jun. 15, 1989.

Ouh–Young, "Force Display in Molecular Docking," Order No. 9034744, pp. 1–369, 1990.

Tadros, Control System Design for a Three Degree of Freedom Virtual Environment Simulator Using Motor/Brake Pair Actuators, MIT Archive© Massachusetts Institute of Technology, pp. 1–88, Feb. 1990.

Caldwell, et al., "Enhanced Tactile Feedback (Tele–Traction) Using a Multi–Functional Sensory System," 1050–4729/93, pp. 955–960, 1993.

Adelstein, "Design and Implementation of a Force Reflecting Manipulandum for Manual Control research," DSC–vol. 42, Advances in Robotics, Edited by H. Kazerooni, pp. 1–12, 1992.

Gotow et al, "Controlled Impedence Test Apparatus for Studying Human Interpretation of Kinesthetic Feedback," WA11–11:00, pp. 332–337.

Stanley et al., "Computer Simulation of Interacting Dynamic Mechanical Systems Using Distributed Memory Parallel Processors," DSV–vol. 42, Advances in Robotics, pp. 55–61, ASME 1992.

Russo, "Controlling Dissipative Magnetic Particle Brakes in Force Reflective Devices," DSC–vol. 42, Advances in Robotics, pp. 63–70, ASME 1992.

Kontarinis et al., "Display of High–Frequency Tactile Information to Teleoperators," Telemanipulator Technology and Space Telerobotics, Won S. Kim, Editor, Proc. SPIE vol. 2057, pp. 40–50, Sep. 7–9, 1993.

Patrick et al., "Design and Testing of A Non–reactive, Fingertip, Tactile Display for Interaction with Remote Environments," Cooperative Intelligent Robotics in Space, Rui J. deFigueiredo et al., Editor, Proc. SPIE vol. 1387, pp. 215–222, 1990.

Adelstein, "A Virtual Environment System For The Study of Human Arm Tremor," Ph.D. Dissertation, Dept. of Mechanical Engineering, MIT, Jun. 1989.

Bejczy, "Sensors, Controls, and Man–Machine Interface for Advanced Teleoperation," Science, vol. 208, No. 4450, pp. 1327–1335, 1980.

Bejczy, "Generalization of Bilateral Force–Reflecting Control of Manipulators," Proceedings Of Fourth CISM–IFToMM, Sep. 8–12, 1981.

McAffee, "Teleoperator Subsystem/Telerobot Demonsdtrator: Force Reflecting Hand Controller Equipment Manual," JPL D–5172, pp. 1–50, A1–A36, B1–B5, C1–C36, Jan. 1988.

Minsky, "Computational Haptics: The Sandpaper System for Synthesizing Textue for a Force–Feedback Display," Ph.D. Dissertation, MIT, Jun. 1995.

Jacobsen et al., "High Performance, Dextrous Telerobotic Manipulator With Force Reflection," Intervention/ROV '91 Conference & Exposition, Hollywood, Florida, May 21–23, 1991.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30–Oct. 1, 1992.

IBM Technical Disclosure Bullein, "Mouse Ball–Actuating Device With Force and Tactile Feedback," vol. 32, No. 9B, Feb. 1990.

Terry et al., "Tactile Feedback In A Computer Mouse," Proceedings of Fourteenth Annual Northeast Bioengineering Conference, University of New Hampshire, Mar. 10–11, 1988.

Howe, "A Force–Reflecting Teleoperated Hand System for the Study of Tactile Sensing in Precision Manipulation," Proceedings of the 1992 IEEE International Conference on Robotics and Automation, Nice, France, May 1992.

Eberhardt et al., "OMAR—A Haptic display for speech perception by deaf and def–blind individuals," IEEE Virtual Reality Annual International Symposium, Seattle, WA, Sep. 18–22, 1993.

Rabinowitz et al., "Multidimensional tactile displays: Identification of vibratory intensity, frequency, and contractor area," Journal of The Accoustical Society of America, vol. 82, No. 4, Oct. 1987.

Bejczy et al., "Kinesthetic Coupling Between Operator and Remote Manipulator," International Computer Technology Conference, The American Society of Mechanical Engineers, San Francisco, CA, Aug. 12–15, 1980.

Bejczy et al., "A Laboratory Breadboard System For Dual–Arm Teleoperation," SOAR '89 Workshop, JSC, Houston, TX, Jul. 25–27, 1989.

Ouh–Young, "A Low–Cost Force Feedback Joystick and Its Use in PC Video Games," IEEE Transactions on Consumer Electronics, vol. 41, No. 3, Aug. 1995.

Marcus, "Touch Feedback in Surgery," Proceedings of Virtual Reality and Medicine The Cutting Edge, Sep. 8–11, 1994.

Bejczy, et al., "Universal Computer Control System (UCCS) For Space Telerobots," CH2413–3/87/0000/0318501.00 1987 IEEE, 1987.

Aukstakalnis et al., "Silicon Mirage: The Art and Science of Virtual Reality," ISBN 0–938151–82–7, pp. 129–180, 1992.

Eberhardt et al., "Including Dynamic Haptic Perception by The Hand: System Description and Some Results," DSC–vol. 55–1, Dynamic Systems and Control: vol. 1, ASME 1994.

Gobel et al., "Tactile Feedback Applied to Computer Mice," International Journal of Human–Computer Interaction, vol. 7, No. 1, pp. 1–24, 1995.

Pimentel et al., "Virtual Reality: through the new looking glass," $2^{nd}$ Edition; McGraw–Hill, ISBN 0–07–050167–X, pp. 41–202, 1994.

"Cyberman Technical Specification," Logitech Cyberman SWIFT Supplement, Apr. 5, 1994.

Ouhyoung et al., "The Development of A Low–Cost Force Feedback Joystick and Its Use in the Virtual Reality Environment," Proceedings of the Third Pacific Conference on Computer Graphics and Applications, Pacific Graphics '95, Seoul, Korea, Aug. 21–24, 1995.

Kaczmarek et al., "Tactile Displays," Virtual Environment Technologies.

Kelley, A.J. et al., "MagicMouse: Tactile and Kinesthetic Feedback in the Human–Computer Interface using an Electromagnetically Actuated Input/output Device," Univ. of columbia, Report 1993, pp. 1–27.*

* cited by examiner

CONTROLLING HAPTIC FEEDBACK FOR ENHANCING NAVIGATION IN A GRAPHICAL ENVIRONMENT

CROSS-REFERENCE TO RELATED APPLICATIONS

This application is a continuation-in-part of to the following co-pending U.S. patent applications:

U.S. patent application Ser. No. 09/756,617, filed Jan. 8, 2001, which is a continuation of U.S. patent application Ser. No. 08/571,606, now U.S. Pat. No. 6,219,032, filed on Dec. 13, 1995;

U.S. patent application Ser. No. 09/903,209, filed Jul. 10, 2001, which is a continuation of U.S. patent application Ser. No. 09/499,338, now 6,259,382, filed on Feb. 4, 2000, which is a continuation of U.S. patent application Ser. No. 09/160,985, now U.S. Pat. No. 6,232,891, filed on Sep. 24, 1998, which is a continuation of U.S. patent application Ser. No. 08/756,745, now U.S. Pat. No. 5,825,308, filed on Nov. 26, 1996; and U.S. patent application Ser. No. 09/992,123, filed on Nov. 13, 2001, which is a continuation of U.S. patent application Ser. No. 09/590,856, now U.S. Pat. No. 6,317,116 filed on Jun. 8, 2000, which is a continuation U.S. patent application Ser. No. 08/879,296, now U.S. Pat. No. 6,078,308, filed on Jun. 18, 1997;

and this application claims the benefit of U.S. Provisional Application No. 60/262,286, filed Jan. 16, 2001, and entitled, "Controlling Haptic Feedback During Graphical Image Navigation";

all of these disclosures being incorporated herein by reference in their entireties.

BACKGROUND OF THE INVENTION

The present invention relates to an interface device that allows a user to interface with a computer, and more particularly to a haptic feedback interface device allowing a user to interface with a graphical environment displayed by a computer.

Computer systems are used extensively in many different industries to implement many applications, such as word processing, data management, simulations, games, internet browsing, and other tasks. A computer system typically displays a visual environment to a user on a display screen or other visual output device. Users can interact with the displayed environment to perform functions on the computer, e.g., play a game, operate an application program, experience a simulation, use a computer aided design (CAD) system, etc. Such user interaction can be implemented through the use of a human-computer interface device, such as a joystick, mouse, trackball, steering wheel, knob, stylus and tablet, "joypad" button controller, foot pedal, yoke hand grip, or the like, that is connected to the computer system controlling the displayed environment. The computer updates the environment in response to the user's manipulation of a manipulatable object ("manipulandum") such as a joystick handle or mouse, and provides feedback to the user utilizing the display screen.

One visual, graphical environment that is particularly common is a graphical user interface (GUI). Information within GUI's are presented to users visibly and/or audibly, such as through a video monitor and sound card. Common GUI's include the Windows® operating system from Microsoft Corporation and the MacOS operating system from Apple Computer, Inc. These interfaces allows a user to graphically select and manipulate functions of the operating system, of application programs, and of the computer by using an input device, such as a mouse, trackball, joystick, or the like. Other graphical computer environments are similar to GUI's. For example, graphical "pages" on the World Wide Web of the Internet communication network utilize features similar to that of GUI's to select and operate particular functions. Some computer aided design system, such as autoCAD also provide graphical presentations to the user. A graphical environment may also comprise a game or simulation environment.

Several types of tasks are typically performed by a user in a graphical environment. A cursor is often used to select graphical objects or manipulate graphical objects, such as resizing or moving the objects. The user must navigate a cursor through the graphical objects in the environment to perform these tasks and to place the cursor in desired locations to perform other tasks. Thus, it is desirable to provide an interface device and method that will provide improved haptic feedback, for example while navigating a graphical environment.

SUMMARY OF THE INVENTION

The inventions disclosed herein are directed to enhancing the navigation of a cursor or other controlled displayed object within a graphical environment, particularly in relation to other graphical objects displayed in the environment. Some inventions are related to the velocity or rate of object interaction of the cursor, while others are related to duration of engagement of the cursor with other graphical objects.

More particularly, one aspect of the present inventions provides an interface device capable of communicating with a computer running an application program and generating a graphical environment The interface device includes a user manipulatable object capable of controlling the motion of a cursor displayed in the graphical environment and an actuator for outputting a haptic effect to a user of the interface device. A modulator modulates the magnitude of the haptic effect in relation to a velocity of the cursor, where the magnitude of the haptic effect at a lower cursor velocity is greater than the magnitude of the haptic effect at a higher cursor velocity. A haptic effect can be output for each of multiple graphical objects over which the cursor moves. The magnitude can be modulated based on the cursor velocity using one or more predetermined functions, including linear, step, and adaptive functions.

In another aspect of the present inventions, an interface device is capable of communicating with a computer generating a graphical environment and includes a user manipulatable object capable of controlling the motion of a cursor, an actuator for outputting a haptic effect to a user, and a modulator to modulate the magnitude of the haptic effect in relation to a rate of interaction of the cursor with graphical objects displayed in the graphical environment. The magnitude of the haptic effect at a lower rate of interaction is greater than the magnitude of the haptic effect at a higher rate of interaction. One or more functions can govern the modulation of the magnitude. The modulation can include examining a number of graphical objects encountered by the cursor in a predetermined period of time to determine the rate of interaction; or, the modulation can be based on a time elapsed from the cursor exiting one graphical object and interacting with another graphical object.

In another aspect of the present inventions, a method for adjusting a magnitude of haptic effects associated with graphical objects displayed in a graphical environment provided by a computer includes determining a haptic effect to be output by an actuator to a user of an interface device, where the haptic effect initiated is based on an interaction of a cursor with one of the graphical objects, and where the determining of the haptic effect includes determining a magnitude of the effect; and adjusting the determined magnitude based on a current velocity of the cursor in the graphical environment, the adjusting being performed after the haptic effect is determined.

In another aspect of the present invention, an interface device capable of communicating with a computer running an application program and generating a graphical environment includes a user manipulatable object capable of controlling the motion of a cursor and an actuator for outputting a haptic effect to a user. A modulator modulates the magnitude of the haptic effect based on an amount of time that the cursor engages the graphical object, where the magnitude of the haptic effect is reduced after a predetermined period of time. The modulator can modulate the magnitude based on a time function, where the time function provides a magnitude inversely proportional to an amount of time that has lapsed since the cursor engaged the target.

The present inventions control haptic output of a haptic feedback device to assist the user in navigating a graphical environment such as a GUI, where haptic feedback is provided when it would be helpful to the user and is reduced at other times. The velocity-based, rate of interaction based, and engagement time methods allow the user to coarsely position the cursor and navigate graphical objects without haptic sensations interfering in selection, positioning, and other navigational tasks.

These and other advantages of the present invention will become apparent to those skilled in the art upon a reading of the following specification of the invention and a study of the several figures of the drawing.

DETAILED DESCRIPTION OF PREFERRED EMBODIMENTS

The present invention relates to controlling haptic feedback during the navigation of a graphical image in a graphical environment, for example a graphical environment generated by a computer. Although the process is illustrated in the context of navigating a cursor or pointer on a computer display, the present invention can be used while navigating other graphical images or and should not be limited to the examples provided herein.

Figure 1:
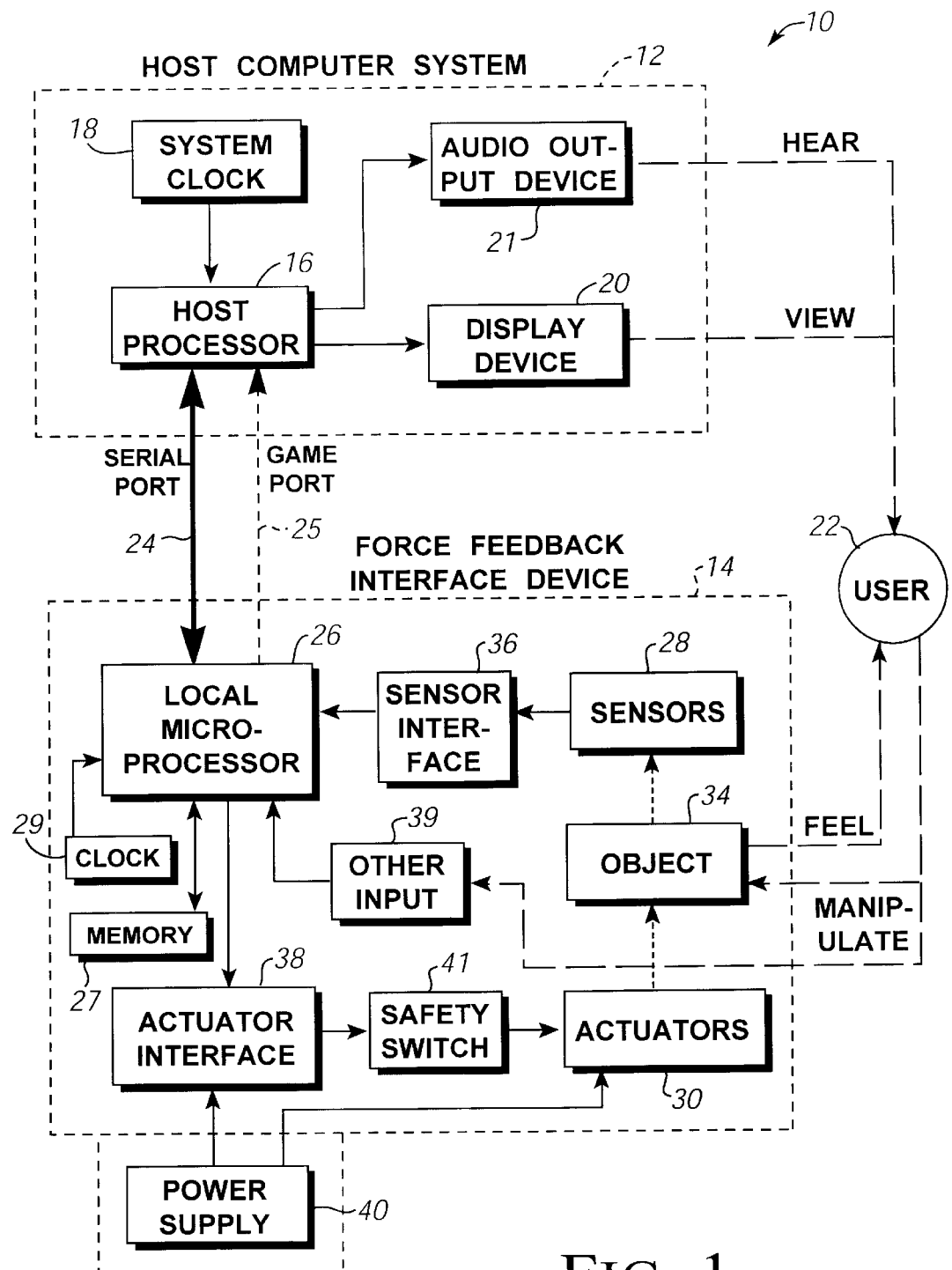
FIG. 1 is a block diagram of a haptic feedback system suitable for use with the present invention.

FIG. 1 is a block diagram illustrating a version of a system 10 of the present invention comprising a host computer 12 and an interface device 14. The interface device comprises a user object 34 manipulatable by a user 22. As the user object 34 is manipulated, sensors 28 detect the manipulation and the manipulation is communicated to the host computer to, for example, control the positioning of a graphical image, such as a cursor, on a display device 20. In one version, the interface device is a haptic feedback interface device capable of providing haptic feedback to the user, for example through the user object 34. By haptic feedback it is meant any feedback to the user 22 that involves the user's sense of touch. For example, the haptic feedback may comprise the application of a passive force, an active force, and/or a tactile sensation, as will be described.

In the version shown in FIG. 1, host computer 12 may be a personal computer, such as an IBM-compatible or Macintosh personal computer, or a workstation, such as a SUN or Silicon Graphics workstation. For example, the host computer 12 can be a personal computer which operates under the MS-DOS or Windows operating systems in conformance with an IBM PC AT standard. Alternatively, host computer 12 can be one of a variety of home video game systems commonly connected to a television set, such as systems available from Nintendo, Sega, Sony, or Microsoft. In other embodiments, host computer system 12 can be a "set top box" which can be used, for example, to provide interactive television functions to users, or other devices or appliances providing electronic functions to users.

In the described embodiment, host computer system 12 implements a host application program with which a user 22 is interacting via peripherals and interface device 14. For example, the host application program can be a computer aided design or other graphic design program, an operating system, a video game, a virtual reality simulation such as a medical simulation, a scientific analysis program, or other application program that utilizes haptic feedback. The host application program may comprise an interactive graphical environment, such as a graphical user interface (GUI) to allow the user to input information to the program. Typically, the host application provides images to be displayed on a display output device and/or outputs other feedback, such as auditory signals.

In the version illustrated, host computer 12 includes a host processor 16, random access memory (RAM) (not shown), read-only memory (ROM) (not shown), input/output (I/O) electronics (not shown), a clock (not shown), a display device 20, and an audio output device 21. Host processor 16 can include a variety of available microprocessors from Intel, AMD, Motorola, or other manufacturers. Processor 16 can be single microprocessor chip, or can include multiple primary and/or co-processors. Processor 16 preferably retrieves and stores instructions and other necessary data from RAM and ROM, as is well known to those skilled in the art. The clock may comprise a standard clock crystal or equivalent component to provide timing to electrical signals used by processor 16 and other components of the computer system. The clock is accessible by host processor 16 in the control process of the present invention, as will be described. Display device 20 is coupled to host processor 16 by suitable display drivers and can be used to display images generated by host computer system 12 or other computer systems. Display device 20 can be a display screen (LCD, plasma, CRT, etc.), 3-D goggles, projection device, or any other visual interface. In one version, the display device 20 displays a graphical user interface and a graphical image, such as a cursor or pointer, for interaction therewith. In another version, display device 20 displays images of a simulation or game environment. Alternatively or additionally, other images, such as images describing a point of view from a first-person perspective or images describing a third-person perspective of objects, backgrounds, etc, can be displayed. Accordingly, a user 22 of the host computer 12 and interface device 14 can receive visual feedback by viewing display device 20. Audio output device 21, such as speakers, is preferably coupled to host processor 16 via amplifiers, filters, and other circuitry well known to those skilled in the art. Host processor 16 outputs signals to speakers 21 to provide sound output to user 22 when an "audio event" occurs during the implementation of the host application program. Other types of peripherals can also be coupled to host processor 16, such as storage devices (hard disk drive, CD ROM drive, floppy disk drive, etc.), printers, and other input and output devices.

In the version shown, host computer 12 may receive sensor data or a sensor signal via a bus 24 in communication with the interface device 14 and other information. Processor 16 can receive data from bus 24 using I/O electronics, and can use I/O electronics to control other peripheral devices. Host computer 12 can also generate and output a signal, or "command", to interface device 14 via bus 24. The signal may be related to a haptic effect to be output by the interface device 14 to the user 22.

The host computer 12 may display graphical computer images. These computer images are related to logical software unit collections of data and/or procedures that may be displayed as an image by computer 12 on display screen 20, as is well known to those skilled in the art. The graphical image may interact with other graphical images within a graphical environment, and the interaction may be under the control of a user. For example, the graphical image may comprise a cursor or pointer that interacts with other graphical images in a graphical user interface, such as a Windows operating system. Alternatively or additionally, a gaming image may interact within a gaming graphical environment. For example, the graphical image may comprise a third-person view of a car. Alternatively, the graphical image may be at least a portion or all of the graphical environment as viewed from a first-person perspective, such as a displayed or simulated cockpit of an aircraft or a view from the cockpit of an aircraft.

In one version, the interface device 14 may coupled to the host computer 12 by a bi-directional bus 24. The bi-directional bus sends signals in either direction between host computer 12 and the interface device 14. Bi-directional bus 24 can be a serial interface bus, Universal Serial Bus (USB), MIDI bus, Firewire bus, parallel bus or other protocol bus well known to those skilled in the art. A wireless communication link (e.g., radio or infrared) can alternatively be used.

Interface device 14 may include a local processor 26, sensors 28, actuators 30, a user object 34, optional sensor interface 36, an optional actuator interface 38, and other optional input devices 39. The interface device 14 may comprise one or more housings for holding the sensors 28, actuators 30, local processor 26, and other related electronic components, to which user object 34 is directly or indirectly coupled. In the preferred embodiment, multiple interface devices 14 can be coupled to a single host computer system 12 through bus 24 (or multiple buses 24) so that multiple users can simultaneously interface with the host application program. In addition, multiple players can interact in the host application program with multiple interface devices 14 using networked host computers 12.

Local processor 26 may communicate with host 12 via bus 24 and may be included within a housing of interface device 14 to allow quick communication with other components of the interface device. Local processor 26 is considered "local" to interface device 14, e.g., at least partially dedicated to haptic feedback and sensor I/O of interface device 14. Processor 26 can be provided with software instructions to wait for commands or requests from computer host 16, decode or parse the command or request, and handle/control input and output signals according to the command or request. In addition, processor 26 preferably operates independently of host computer 16 by reading sensor signals and calculating appropriate forces from those sensor signals, time signals, and force processes selected in accordance with a host command. Suitable microprocessors for use as local processor 26 include the MC68HC711E9 by Motorola and the PIC16C74 by Microchip, for example. Local processor 26 can include one microprocessor chip, or multiple processors and/or co-processor chips. In other embodiments, processor 26 can include a digital signal processor (DSP) chip, or state machines, logic gates, an ASIC, etc.

Local memory 27, such as RAM and/or ROM, may be coupled to local processor 26 in interface device 14 to store instructions for processor 26 and store temporary and other data. A local clock 29 may be provided in the interface device 14 and may be coupled to the local processor 26 to provide timing data, similar to system clock 18 of host computer 12.

The host computer 14 and/or local processor 26 may be used to control the output of haptic feedback to the user. Many embodiments are described in greater detail in U.S. Pat. Nos. 5,734,373; 6,211,861; 5,889,670; 5,691,898; and in copending patent application Ser. Nos. 09/687,744 and 09/637,513, all of which are incorporated herein by reference in their entireties. For example, in a host-control embodiment, host computer 12 can provide low-level haptic commands (e.g., streaming data) over bus 24, and the local processor 26 then directly provides the haptic commands to one or more actuators 30 to allow the data to control the actuators directly (or, the host commands are provided to the actuators 30 by other electronics, and no processor 26 is included in device 14). In another local control version, host computer system 12 can provide high level supervisory commands to local processor 26 over bus 24, and the local processor 26 parses or decodes the commands and manages low level control loops to sensors 28 and actuators 30 in accordance with the high level commands and force processes (e.g., firmware). A mixture of these types of control can also be used.

Sensors 28 detect the position, motion, and/or other characteristics of a user object 34 and/or a user's manipulation of the user object 34 along one or more degrees of freedom and provide one or more signals to processor 26 including information representative of those characteristics. One or more sensors 28 may be provided for a single degree of freedom or multiple degrees of freedom along which the user object 34 may be moved or forced. Examples of sensors suitable for several embodiments described herein are digital optical encoders, analog potentiometers, magnetic (Hall effect) sensors, stain gauges, optical sensors, velocity or acceleration sensors, or other types of sensors. Either relative or absolute sensors can be used. Sensors 28 can provide an electrical signal to an optional sensor interface 36, which can be used to convert sensor signals to signals that can be interpreted by the processor 26 and/or host computer system 12. Alternately, processor 26 can perform these interface functions without the need for a separate sensor interface 36 or the sensor signals can be provided directly to host computer system 12.

Actuators 30 transmit forces to the user 22 manipulating the interface device 34, where the forces can be transmitted via object 34 and/or through another feature of the interface device, such as the housing, in response to signals received from local processor 26 and/or host computer 14. If forces are output to the user object, the actuators can output forces in one or more directions along one or more degrees of freedom of object 34; an actuator 30 can provided for each degree of freedom along which forces are desired to be transmitted. In tactile embodiments where forces are transmitted to the user not kinesthetically via the user object, the actuator(s) 30 can cause forces in the housing, user object 34, or other contacted surface; such forces can include pulses, vibrations, textures, etc. Some embodiments can include drive transmissions (gears, capstans, belt drives, etc.) to amplify force output. Some embodiments can include an actuator assembly to convert actuator output to a force having a desired direction, magnitude, etc. For example, U.S. application Ser. No. 09/585,741, incorporated herein by reference in its entirety, describes one such assembly.

Actuators 30 can include two types: active actuators and passive actuators. Active actuators include motors, linear current control motors, stepper motors, pneumatic/hydraulic active actuators, voice coil actuators, moving magnet actuators, torquers, and other types of actuators that transmit a force to move or force an object. For example, active actuators can drive a rotational shaft about an axis in a rotary degree of freedom, or drive a linear shaft along a linear degree of freedom. Passive actuators can also be used for actuators 30. The passive actuator may comprise a magnetic particle brake, a friction brake, a pneumatic/hydraulic passive actuator, or the like, and may be used in addition to or instead of a motor to generate a damping resistance or friction in a degree of motion. Actuator interface 38 can be optionally connected between actuators 30 and processor 26 to convert signals from processor 26 into signals appropriate to drive actuators 30.

Other input devices 39 can optionally be included in interface device 14 and send input signals to local processor 26. Such input devices can include buttons, dials, switches, or other mechanisms. The interface device may have a separate power supply 40 or may be powered through its connection to the host computer 12. Alternatively, power from the host can be stored and regulated by interface device 14 and thus used when needed to drive actuators 30. Safety switch 41 may be included in interface device 14 to provide a mechanism to allow a user 22 to override and deactivate one or more actuators 30, or require a user 22 to activate one or more actuators 30, for safety reasons.

The user object (or manipulandum) 34 may be a device or article that may be grasped or otherwise physically contacted by a user 22 and which is in communication with interface device 14. The user 22 can manipulate and move the object along provided degrees of freedom to interface with the graphical environment generated by the host application program the user is viewing on display device 20. The user object 34 may be, for example, a joystick, mouse, trackball, stylus, steering wheel, medical instrument (laparoscope, catheter, etc.), pool cue, hand grip, knob, button, or other article.

Many types of user interface devices can be used with the features of the inventions described herein. Some examples of user interface devices are described in U.S. Pat. Nos. 6,100,874; 6,166,723; 5,767,839; 6,104,382; 6,154,201; 5,790,108; and 5,805,140, all of which are incorporated herein by reference in their entireties.

The system of the present invention may comprise two primary modes or "control paradigms" of operation for interface device 14: position control (isotonic) mode and rate control (isometric) mode. In position control mode, movement of the interface device is directly translated into motion of a controlled cursor or entity, i.e. a direct mapping between user object and controlled object is provided. Thus, motion of a mouse on a surface is mapped to equivalent motion of a controlled cursor displayed on the display screen in the same direction and for a proportional distance. In rate control mode, movement of the interface device is translated to a new rate of change of a controlled value or a characteristic of a controlled object based on the new interface device position. For example, motion of a joystick in a direction can be mapped to motion of a controlled cursor in an equivalent direction at a velocity proportional to the position of the joystick with reference to the joystick's origin position. Under rate control, the user object can be held steady at a given position but the simulated object under control can be in motion at a given commanded velocity, while position control only allows the object under control to be in motion if the user object is in motion.

Figure 2:
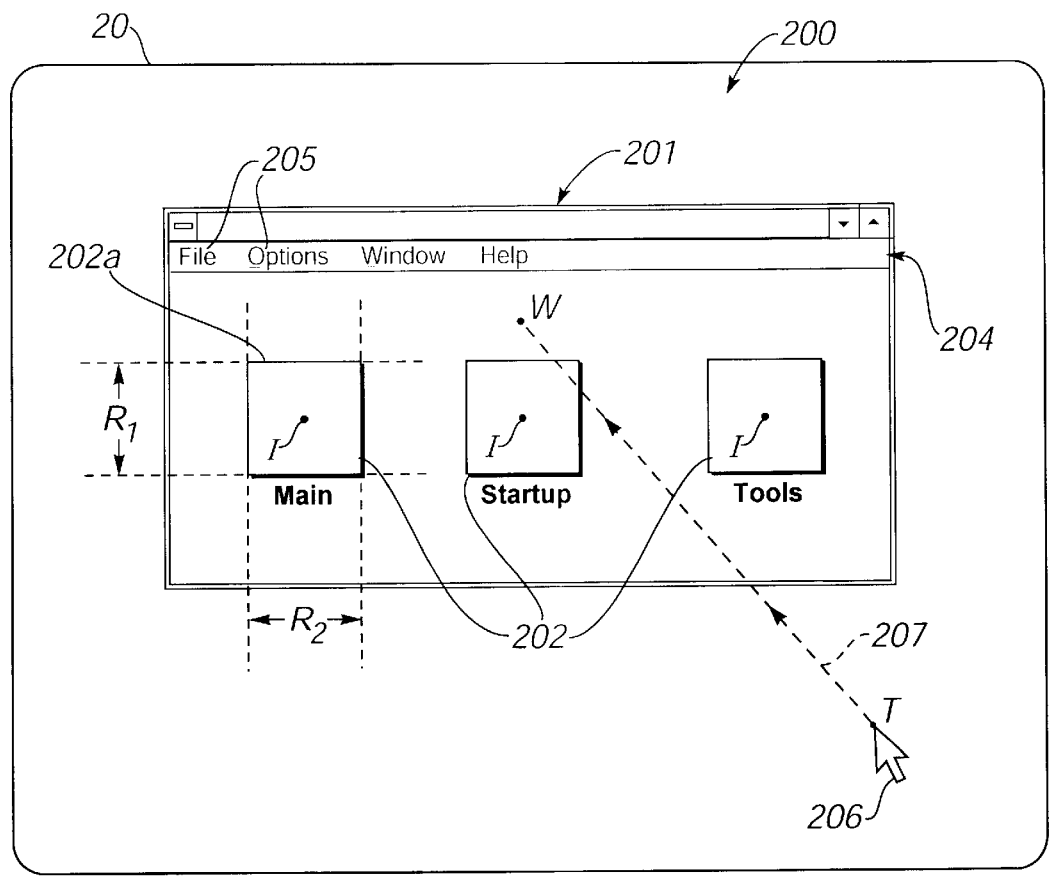
FIG. 2 is a diagrammatic illustration of a graphical user interface including graphical objects associated with haptic effects.

FIG. 2 is a diagrammatic illustration of a display screen 20 displaying a graphical environment. In the version shown, the graphical environment is a graphical user interface (GUI) 200 used for interfacing with an application program and/or operating system implemented by computer 12. One embodiment described herein implements haptic feedback technologies in position control (i.e. isotonic) mode to embellish a graphical user interface with physical sensations. Alternatively, an isometric mode may be employed, as described in U.S. Pat. No. 5,825,308, which is incorporated herein by reference in its entirety. By communicating with interface device 14, the computer 12 can present not only standard visual and auditory information to the user, but also physical forces. These physical forces can be carefully designed to enhance manual performance as described below. A detailed explanation of forces and force effects provided within a GUI or other graphical environment is disclosed in U.S. Pat. No. 6,219,032, incorporated by reference herein in its entirety. A detailed explanation of various interface devices usable for navigating the graphic image in the graphical environment are disclosed in U.S. Pat. Nos. 5,825,308; 6,219,032; 6,078,308, 6,088,019, 6,243,078; 6,211,861; and U.S. patent application Ser. No. 09/585,741, all of which are incorporated herein by reference in their entireties.

Herein, the manual tasks of the user to move a cursor displayed on screen 20 to a desired location or displayed object in a graphical environment by physically manipulating user object 34 in order to navigate the graphical environment, are described as "targeting" activities. "Targets," as referenced herein, are defined regions in the graphical environment, such as the GUI 200, to which a graphical object, such as a cursor, may be moved by the user. The "target" may be associated with one or more forces or haptic effects, for example one or more forces or haptic effects may be associated with a graphical object of the GUI 200 graphical environment. In the GUI 200 version, targets can be associated with, for example, graphical objects such as icons, pull-down menu items, and buttons. A target usually is defined as the exact dimensions of its associated graphical object, and is superimposed and "attached" to its associated graphical object such that the target has a constant spatial position with respect to the graphical object. In the GUI context, "graphical objects" are those images appearing on the display screen which the user may select with a cursor to implement a function of an application program or operating system, such as displaying images, executing an application program, or performing another computer function. For simplicity, the term "target" may refer to the graphical object itself; thus, an icon or window itself is often referred to herein as a "target." However, more generally, a target need not follow the exact dimensions of the graphical object associated with the target. For example, a target can be defined as either the exact displayed area of an associated graphical object, or a target can be defined as only a portion of the graphical object. A target can also be a different size and/or shape than its associated graphical object, and/or may be positioned a distance away from its associated graphical object. The entire screen or background of GUI 200 can also be considered a "target" which may provide forces on user object 34. In addition, a single graphical object can have multiple targets associated therewith.

Upon moving the cursor to the desired target, the user typically maintains the cursor at the acquired target while providing a "command gesture" associated with a physical action such as pressing a button, squeezing a trigger, or otherwise providing a command to execute a particular program function associated with the target. The command gesture can be provided from any input device. For example, the "click" (press) of a physical button positioned on a mouse while the cursor is on an icon allows an application program that is associated with the icon to execute. Likewise, the click of a button while the cursor is on a portion of a window allows the user to move or "drag" the window across the screen by moving the user object. The command gesture can be used to modify forces or for other functions in the present invention as well. Or, the command gesture can be provided by manipulating the physical object of the interface device within designated degrees of freedom and/or with graphical objects displayed on the screen. In other embodiments, graphical objects on the screen can provide a command gesture when manipulated by a user. For example, a spring force on user object 34 can be associated with pressing a graphical button with a cursor to provide the feel of a mechanical button.

The GUI 200 permits the user to access various functions implemented by an operating system or application program running on computer system 12. These functions typically include, but are not limited to, peripheral input/output functions (such as writing or reading data to disk or another peripheral), selecting and running application programs and other programs that are independent of the operating system, selecting or managing programs and data in memory, viewing/display functions (such as scrolling a document in a window, displaying and/or moving a cursor or icon across the screen, displaying or moving a window, displaying menu titles and selections, etc.), and other functions implemented by computer system 12. For simplicity of discussion, the functions of application programs such as word processors, spreadsheets, CAD programs, video games, web pages, and other applications as well as functions of operating systems such as Windows™, MacOS™, and Unix, will be subsumed into the term "program functions." Typically, application programs make use of such functions to interface with the user; for example, a word processor will implement a window function of an operating system (or GUI, if the GUI is separate from the operating system) to display a text file in a window on the display screen. In addition, other types of interfaces are similar to GUI's and can be used with the present invention. For example, a user can set up a "web page" on the World Wide Web which is implemented by a remote computer or server. The remote computer is connected to host computer 12 over a network such as the Internet and the Web page can be accessed by different users through the network. The page can include graphical objects similar to the graphical objects of a GUI, such as icons, pull-down menus, etc., as well as other graphical objects, such as "links" that access a different web page or page portion when selected. These graphical objects can have forces associated with them to assist in selecting objects or functions and informing the user of the graphical layout on the screen. Such an embodiment is described in greater detail in U.S. Pat. No. 5,956,484, which is incorporated herein by reference in its entirety.

GUI 200 is preferably implemented on host computer 12 and processor using program instructions. The use of program instructions to perform functions and operations on a host computer and microprocessor is well known to those skilled in the art, and can be stored on a "computer readable medium." Herein, such a medium includes by way of example memory such as RAM and ROM coupled to host computer 12, memory, magnetic disks (diskette, hard disk, etc.), magnetic tape, optically readable media such as CD ROMs, semiconductor memory such as PCMCIA cards or game cartridges, etc.

In FIG. 2, the display screen 20 displays GUI 200, which can, for example, be implemented by a Microsoft Windows® operating system, a Macintosh operating system, X-Windows in Unix, or any other available operating system incorporating a GUI. In the example shown, a window 201 contains various icons 202 that are grouped by window 201, here labeled as "Main", "Startup", and "Tools", although other or different icons may be grouped within window 201. A menu bar 204 may be included in window 201 in some GUI embodiments which permits pull-down menus to appear by selecting menu heading targets 205 with a user-controlled graphical image, such as a cursor 206, that is controlled by the user via a user object 34. In the subsequent description, the terms "user-controlled graphical image" and "cursor" will be used interchangeably.

The present invention provides haptic feedback to the user through user object 34 based on a location, a velocity, an acceleration, a history of one or more of these values, and/or other characteristics of the cursor 206 or other graphical objects within the GUI 200 environment (position of the cursor herein is generally associated with the position of user object 34, unless a rate control embodiment is described). Other "events" within the GUI may also provide forces. Several preferred embodiments of different forces or haptic effects can be output to the user, some of which are described in U.S. Pat. Nos. 6,219,032 and 6,211,861. These haptic effects can be forces of a single magnitude in one direction, or they may be an interaction or sequence of forces, for example, to create the sensation of a texture, a vibration, a damping force, a spring, a barrier, etc. The terms "force", "force sensation", "haptic", and "haptic effect" are used interchangeably herein.

Many different types of force sensations, or "force effects" as referred to herein, can be output to the user based on interactions of the cursor with graphical objects in the GUI 200. Two types of haptic feedback effects can benefit from the present inventions: kinesthetic haptic effects and tactile haptic effects. Kinesthetic effects are those that are output by outputting forces on the user object 34 in at least one of the degrees of freedom of the user object. For example, a joystick handle rotatable along X- and Y-axes may have motors to output forces in those axes, allowing kinesthetic haptic effects on the joystick handle. A kinesthetic mouse device allows forces to be output in the planar degrees of freedom of the mouse. A tactile haptic effect typically outputs forces to the user not the degrees of freedom of the user object; for example, a vibration can be output to the user contacting the housing of the device. Some haptic effects, such as vibrations, can be output by kinesthetic haptic devices or tactile haptic devices.

One type of haptic effect is an attractive/repulsive force. In one embodiment, targets such as window 201, icons 202 and menu headings 205 can have attractive force fields associated with them to bias the user object 34 toward the target and enhance the user's ability to move cursor 206 to or around the targets. Thus, this type of haptic effect is suitable for kinesthetic haptic feedback devices in which forces can be output on the user object 34, in the degrees of freedom in which the user object 34 is moved to control the cursor or other graphical image. In one embodiment, the haptic feedback depends upon a distance between cursor 206 and a target, such as window 201. The distance can be measured from one or more points within the window 201 or its perimeter.

For example, icons 202 may have an attractive force associated with them. This attractive force can originate from a desired point I within each icon 202, which may be located at the center position of the icon, or located at a different area of icon 202, such as near the perimeter of the icon. Likewise, window 201 may have an attractive force associated with it which originates from a point W within window 201, which may be at the center of the window. Points I and W are considered to be "field origin points." Alternatively, force fields can originate from a point or region not shown on the screen. These attractive forces are known as "external forces" since they affect the cursor 206 when the cursor is positioned externally to the targets. External and internal forces of targets are described in greater detail with respect to FIG. 3.

The attractive forces associated with window 201 and icons 202 are applied to user object 34 to influence the movement of user object 34 and cursor 206. Thus, an attractive force associated with window 201 will cause host computer 12 (or processor 26) to command the actuators 30 of interface device 14 to apply appropriate forces on user object 34 to move or bias the user object 34. Forces are applied to user object 34 in a direction such that cursor 206 is correspondingly biased in a direction toward field origin point W of window 201. It should be noted that the forces to user object 34 do not actually have to move the user object in the appropriate direction. For example, when using passive actuators, the user object cannot be physically moved by the actuators. In this case, resistive forces can be applied so that user object 12 is more easily moved by the user in the appropriate direction, and is blocked or feels resistance when moving in other directions away from or tangent to point W.

The attractive force applied to user object 34, which would move or bias cursor 206 toward point W, is represented by dotted line 207 in FIG. 2. The force can be applied with reference to a single reference point of cursor 206, which is the tip point T in the described embodiment. In alternate embodiments, the reference point can be at other locations or areas. The attractive forces can be computed, for example, with a 1/R or $1/R^2$ relationship between field origin point W or I and cursor tip T to simulate gravity.

Repulsive force fields may also be associated with a field origin point. For example, it may be desired to prevent cursor 206 from moving to or accessing particular regions or targets on the screen within GUI 200. If window 201 is one such target, for example, a repulsive field in the opposite direction to that represented by line 207 can be associated with window 201 and can originate at field origin point W. The force would move user object 34 and cursor 206 away from the target, making it more difficult for the user to move cursor 206 onto the target.

In one embodiment, the position of cursor 206 determines which field forces will affect the cursor 206 and user object 34. As described in FIG. 3, targets can be associated with internal and external forces in relation to cursor 206. For example, attractive forces can be external forces and thus affect user object 34 and cursor 206 only when the cursor 206 is positioned externally to the target. In one embodiment, only the external forces of the highest level targets that are external to cursor 206 will affect the cursor 206 and object 34. Thus, in FIG. 2, only the attractive force of window 201 may affect cursor 206 and user object 34, since the icons 202 and menu headings 205 are at a lower level (being within window 201). If cursor 206 were positioned within window 201, only the attractive fields of icons 202 and menu headings 205 would affect cursor 206 and user object 34 and the attractive force 207 would preferably be removed. In alternate embodiments, the forces from various targets can be combined or excluded in different ways.

In another example of such an embodiment (not shown), multiple windows 201 can be displayed on display screen 20. All three windows can be at the same hierarchical level, so that when the cursor 206 is positioned outside the perimeter of all three windows, cursor 206 and user object 34 are influenced by a combination of the three external attractive forces, one attractive force from each window. These attractive forces can be summed together as vectors to provide a resulting total attractive force in a resultant direction having a resultant magnitude. When the cursor is positioned in any of the windows, only external forces from objects within that window can be applied.

Tactile force feedback may also be applied to user object 34, where forces can be output through the housing or user object 34 by, for example, moving a mass, shaking the housing, moving parts of the housing or other buttons or surfaces, etc., which the user feels by contacting the housing or moving portion. Some examples of tactile devices are disclosed in U.S. Pat. No. 6,211,861 and U.S. application Ser. No. 09/585,741, all incorporated herein by reference in their entireties. Tactile force sensations can include vibrations, pulses or jolts, textures, etc. For example, when the user moves the cursor 206 over the border of window 201, a pulse can be output on the housing of the user object 34 or device 14, informing the user of this motion. Similarly, when the user moves the cursor over words in a word processing program, pulses can be output. Vibrations or textures can be output while the user is within a certain region, or dragging an object, or resizing an object, for example.

Figure 3:
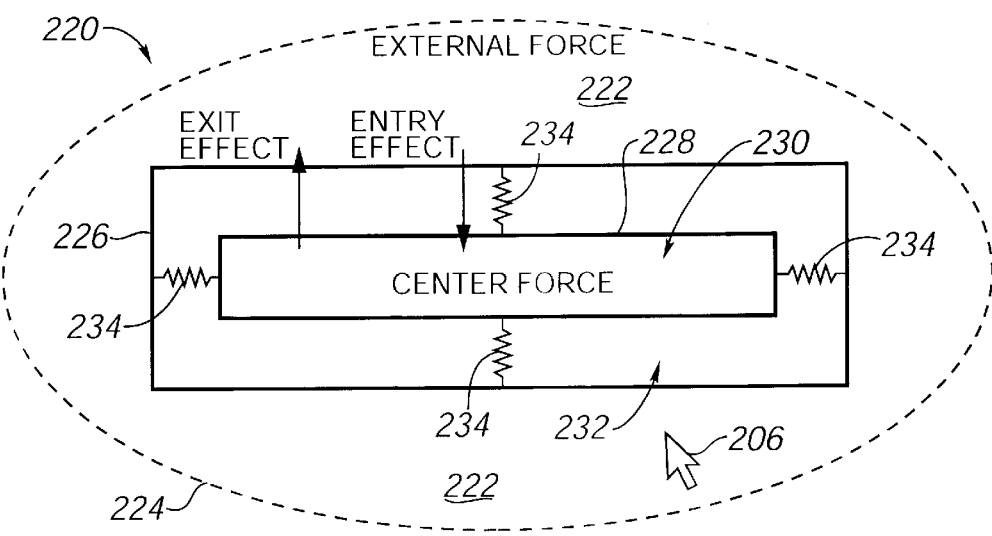
FIG. 3 is a diagrammatic illustration of a graphical object having external and internal forces associated therewith.

FIG. 3 is a diagrammatic illustration of a displayed target illustrating one embodiment of internal and external forces associated with a target. As referred to herein, "external forces" are those haptic effects associated with a target which affect user object 34 when the cursor 206 is positioned externally to that target, i.e. when the cursor positioned outside the perimeter of the target. These types of haptic effects may often include attractive or repulsive forces. In contrast, "internal forces" are those forces associated with a target which affect user object 34 when the cursor 206 is positioned internally to the target, i.e., within the perimeter of the target. Each target can have external forces and internal forces assigned to it. The internal forces and/or external forces associated with a target may be designated as zero, effectively removing those forces.

Target 220 may include an external target region 222 to which an external force associated with target 220 is assigned. External region 222 is defined from a target point in the target to a range limit 224 outside the target, where the external force will be in effect. The external region can be defined from outer perimeter 226 of target 220, or from an inner perimeter 228 of the target 220, if such perimeters are implemented. Attractive, repulsive, texture, vibration, or other haptic effects may be assigned as external forces to targets. In other embodiments, a "groove" external force can be provided for graphical objects, as described in U.S. Pat. No. 6,219,032.

The internal force associated with a target affects user object 34 only when the cursor 206 is within the perimeter of the target. In some embodiments, the inner perimeter 228 is not used and the target 220 can be associated with a single internal haptic effect that is output whenever the cursor 206 is positioned within the target. In other embodiments, an internal target region may include a center region 230 and a capture region 232. Center region 230 is defined as the innermost, central region of target 320 and extends to an inner perimeter 228. In the center region, forces associated with the center region ("center region forces") applied to cursor 206 can be zero magnitude so as to allow substantially free movement of the cursor within this region (also, any external forces of any targets included within target 220 would be in effect). Alternatively, a particular force or haptic effect can be associated with center region 230, such as a texture or vibration, for example.

The capture region 232 is preferably provided at or near a perimeter of target 220. The forces associated with capture region 232 are applied to cursor 206 when the cursor is positioned within or is moved through the capture region. If the sampling rate of a sensor is too slow to detect cursor 306 within the capture region, a history of sensor readings can be checked to determine the path of the cursor and whether the capture force should be applied to user object 12. In the preferred embodiment, two different forces can affect cursor 206, depending on whether the cursor exits target 220, or enters target 220. When the cursor is moved from center region 230 to external region 222, an exit effect can be applied to user object 34. For example, the exit effect can be a barrier or "snap over" force positioned at inner perimeter 228, which preferably includes a spring force as represented symbolically by springs 234 in FIG. 3. The spring force causes a spring resistance to the motion of cursor 206 in the exit direction, which starts as a small resistive force in the direction toward the dead region 230 and which increases as the cursor is moved closer to outer perimeter 226. This barrier force prevents the cursor from easily "escaping" the target 220. Other forces can be substituted in other embodiments, such as a damping barrier force, a pulse, a vibration, etc. Outer perimeter 226 of target 220 can in some embodiments define a snap distance (or width) of the barrier, so that once cursor 206 is moved beyond perimeter 226, the exit capture force is removed.

When the cursor 206 enters target 220, an entry effect can be applied to user object 34. For example, the entry effect may be the same effect as the exit effect, in the same direction toward the dead region 230 (if a direction is provided). For instance, if the entry effect is a spring, when cursor 206 first enters the capture region, the spring force can immediately begin to push the user object 34 in an equivalent direction as toward the center region. The closer the cursor is positioned to the center region, the less spring force is applied. Alternatively, an entry force different from the exit force can be applied. In such an embodiment, the direction of movement of cursor 206 should be established so that it is known whether to provide the exit capture force or the entry capture force.

Other forces can also be applied to the user object 34 (or other part of interface device 14) when operating interface device 14 in isotonic mode. For example, an "inertia" force can be applied when graphical objects are manipulated by the user for particular types of targets and when specific conditions are met. For example, the inertia force can be applied to the user object when the user moves cursor 206 into center region 230, holds down a button on the user object, and moves or "drags" the graphical object (and associated target 220) with cursor 206 across screen 20. The dragged target 220 has a simulated "mass" that will affect the amount of inertia force applied to user object 34. In some embodiments, the inertia force can be affected by the velocity and/or acceleration of cursor 206 in addition to or instead of the simulated mass. Other factors that may affect the magnitude of inertia force, such as gravity, can also be simulated. Alternatively, an icon's mass can be related to how large in terms of storage space (e.g. in bytes) its associated program or file is. Thus, force feedback can directly relate information about a target to the user. In addition, damping and/or friction forces can be provided instead of or in addition to the inertia forces. For example, each graphical object can be assigned a simulated damping coefficient or a coefficient of friction. Such friction might be useful when free-hand drawing in a CAD program, where the coefficient of friction might be based on "pen size." A texture force might also be applied when a graphical object is dragged. In addition, if simulated masses are being used to calculate the external force of a target, such as an attractive gravity force, then that same mass can be used to compute an inertia force for the target. Such haptic effects typically can be output by kinesthetic haptic feedback devices.

Also, inertia forces of graphical objects can also be applied due to collisions or other interactions with other graphical objects and targets. For example, if cursor 206 is dragging an icon, and the icon collides with the edge of a window, then a collision force can be applied to user object 34. This collision force can be based on the speed/direction of the icon/cursor as it was moved, the simulated mass of the icon and/or cursor, and any simulated compliances of the icon/cursor and the edge. Also, certain edges, objects, or regions in GUI 200 can either be designated as "pass-through" objects or as "solid" objects that provide barrier forces that do not allow the cursor to pass into the objects.

Other examples of forces and associated graphical objects and functions include providing force jolts or "bumps" when the cursor 206 encounters a region, when an object is released after having been dragged across the screen, when a window is entered or exited by the cursor, or when a window is opened or closed. In a text document, these bumps can be provided when the cursor moves between words, lines, letters, paragraphs, page breaks, etc. Forces can be associated when a button in a GUI is "pressed", i.e., moved "into" the screen and back out, and/or when command gestures are provided. A "snap to" force simulates a detent in a surface, thus providing a small attraction to a point. This can be useful for menu items or snap-to grid lines in a CAD program or constraining motion to perpendicular or 45-degree angle directions.

Yet other forces include a spring force associated with a position of a target before it is moved. For example, when the user drags an icon, a selection of text, or pull-down menu, a virtual spring is simulated as being attached between the icon's current and former position. Such a spring or other type of force can also be provided on user object 34 when a graphical object is resized between former and current sizes. For example, if the window is dragged to a larger size, then a "stretching" spring force can be applied to the user object, and if the window is dragged to a smaller size, then a "compressing" spring force can be applied. Such features can be provided in a CAD program when graphical objects are stretched or otherwise manipulated.

The forgoing concepts and preferred embodiments can also be applied to other graphical objects appearing in a GUI. For example, pull-down menus (such as a "File" pull-down menu) and menu items in the menu can provide internal and external forces to assist a user in selecting menu items. Similarly, a scroll bar or "slider" can be associated with forces, such that the guide and "thumb" of the slider can be associated with external forces and internal forces to assist the user in manipulating the slider. "Pop-up" windows and panels in GUI 200 can similarly be provided with forces, where buttons in the pop up window may have external and internal forces associated with them. Forces associated with buttons can be "turned off" or otherwise changed after the button has been selected by the user using cursor 206.

It should be noted that similar haptic feedback can be provided in other graphical environments, such as non-GUI graphical environments. For example, in a 3-D video game, texture forces of a dungeon wall might be felt when a user moves a cursor over the wall. Or, a tank selected by the user with a cursor might have a high inertia force associated with it when it is moved in comparison to a small infantry soldier. Alternatively, in a 1-D control knob, a divot or pop might be felt when a target location, such as a numerical target on a scale, is approached by a pointer.

The present invention may provide isometric (rate control) functionality in the same interface device that provides isotonic (position control) functionality. For example, in one embodiment, isometric mode is entered by selecting an input device such as a button. Once isometric mode is entered, an opposing force on the user object can be applied by the actuators 30 (in kinesthetic haptic feedback devices), and the user's input force on the user object is provided as isometric (or elastic) input to the host computer to control, for example, the scrolling of a displayed document, the changing of a value, the speed of a cursor, the zooming or panning of a view, etc. In another embodiment, the interactions between a controlled graphical object such as a cursor and other graphical objects allow isometric input. In other embodiments, the isometric input can be applied to a displayed window or a different associated graphical object in a different way, e.g., to control a text cursor in the window, to zoom the view in the window (see FIGS. 4a–b), to pan the view in the window, etc. The whole view of screen 20 can alternately be panned or scrolled using such isometric input in some embodiments. In a similar embodiment, isometric input can be provided by interacting cursor 206 with typically nonisometric graphical objects displayed on screen 20.

Figure 4A:
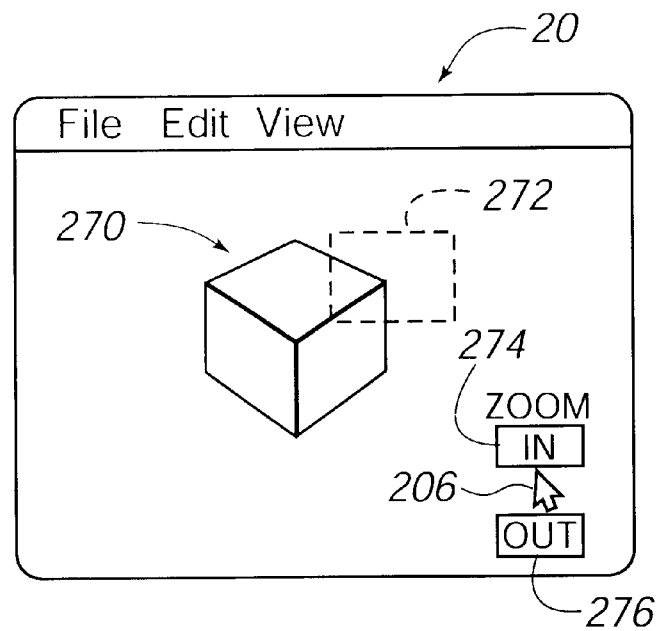
FIGS. 4a and 4b are diagrammatic illustrations of the use of isometric control over the zooming of a view.
Figure 4B:
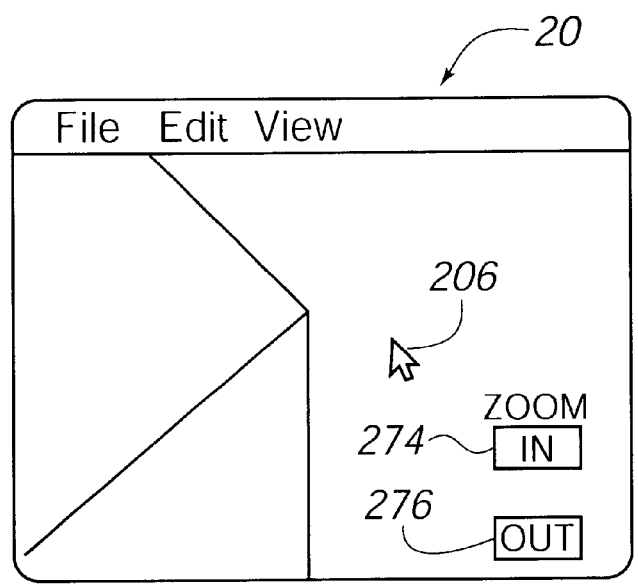

FIGS. 4a and 4b are diagrammatic illustrations of display screen 20 showing an isometrically-controlled zoom function of a CAD program. FIG. 4a shows a cube 270 as a graphical object as displayed by the CAD program. The cube 270 can be manipulated as desired by the user to change the shape of the cube or alter other characteristics. In many cases, isotonic input is the most natural and efficient type of input to move, stretch, copy, or otherwise manipulate cube 270. A user may wish to zoom in the view of cube 270 to see additional detail. In the preferred embodiment, this may be conveniently accomplished by providing isometric input. The view of FIG. 4b shows a zoomed-in view of a portion of cube 270, where dashed box 272 of FIG. 4a indicates the extent of the zoomed view. In this example, to zoom from the view of FIG. 4a to the view of FIG. 4b, the user can press and hold an input device such as a button on the interface device. This can cause a computer-generated resistive force to be applied to the user object in all directions as a result of actuator control. The user then moves the user object against this force in an upward direction to cause a magnification zoom. When the user releases the button, normal isotonic manipulation of cursor 206 is allowed.

In a different embodiment, the user may use cursor 206 to control the zoom function. In FIG. 4a, a "zoom in" isometric object 274 and a "zoom out" isometric object 276 are displayed. Alternatively, the objects need not be displayed. The cursor 206 can be moved against any surface of the appropriate object 274 or 276 to command the associated zoom function of the CAD program. The present invention also allows additional computer-generated forces to be overlaid on the resistive isometric force on user object 34. For example, when the user reaches the maximum zoom magnification, a small jolt can be applied to the user object 34 to inform the user of this condition. In different tactile embodiments of interface device 14, such jolts can be provided in an isometric control mode, but resistive forces are not applied to the motion of the user object.

Enhanced Navigation in Graphical Environments

Haptic Effects as a Function of Velocity

The navigation of a graphical environment can be enhanced to further improve a user's efficiency and/or enjoyment during the navigation. For example, a number of graphical objects, each with a associated haptic effect, may be positioned between a cursor and a target. As a user manipulates the user object 34 to position the cursor at the target, several of the untargeted graphical objects may be in the pathway of the cursor, so that the user may cause the cursor to pass over the untargeted graphical objects. This can result in the user experiencing haptic effects for untargeted graphical objects that are not of immediate interest to the user. This overloading of haptic information, or "haptic clutter," may be disconcerting to the user and may reduce or negate the positive haptic effect that would otherwise be experienced upon reaching the target or during motion to the target. To make haptic navigation more natural, haptic sensations should only be output to the user when they are relevant, such as, for example, when the cursor is near the target position, or only output for objects that are intended for targeting.

In one version of the inventions described herein, user intention for cursor motion can be related to the velocity of motion of the cursor and/or user object of the interface device. The haptic clutter associated with passing the cursor over untargeted graphical objects may be reduced by relating characteristics of the haptic effect to the velocity of the cursor. It has been discovered that a user typically causes the cursor to move at a high velocity when a target is not in immediate proximity to the cursor and then slows the movement of the cursor as it approaches nearer to the target. Thus, according to one invention herein, when the cursor is moving at a high velocity, the haptic effects may be lessened in strength or muted since it is unlikely that the cursor is near an object targeted by the user. As the cursor slows, the haptic effects are strengthened to enhance the user's ability to more accurately and quickly locate the target.

Figure 5A:
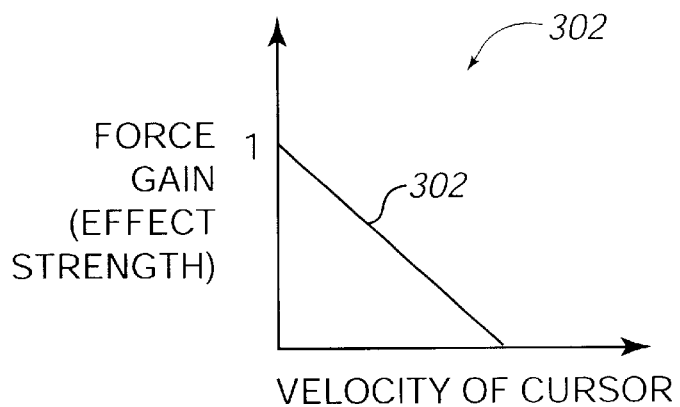
FIGS. 5a, 5b, and 5c are graphs illustrating different embodiments of functions used to provide a strength of haptic effect based on a velocity of the cursor, according to the present inventions.
Figure 5B:
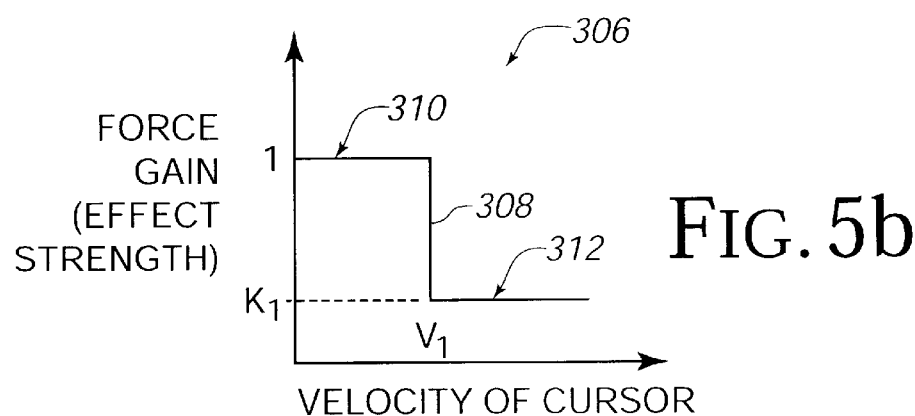

As shown in FIGS. 5a and 5b, the strength of the haptic effect may be proportional to the velocity of the movement of the cursor. Herein, for position control (isotonic) embodiments, the velocity of the cursor is also intended to mean the velocity of the user object in one or more degrees of freedom which controls the cursor. The velocity may be determined in different ways. For example, the velocity can be determined by the interface device 14 (e.g. local processor 26) or by host computer 12 by dividing the measured motion or displacement of the cursor (or user object) by a specific time interval. For example, in one version, the local processor 26 may determine the position of the cursor at fixed intervals of time. The change in displacement during the period between intervals may be divided by the amount of time that lapses during the period, and the value may be stored as the current velocity of the cursor. Also, several such velocity values can be stored over time and averaged to determine the velocity. Alternatively, when using periods of fixed duration, the change in displacement is directly related to an approximation of the velocity of the cursor during the period, and the change in displacement may be stored as the current velocity of the cursor. In other embodiments, the velocity can be determined in other ways; for example, velocity sensors can directly determine the velocity of the user object 34, or velocity can be determined from acceleration data from an accelerometer measuring motion of the user object 34.

According to one aspect of the present inventions, after a haptic effect has been determined based on cursor interaction with a target, and the haptic effect is ready to be output on the user object 34 (e.g., when the cursor passes into the external or internal region of an object, or, more generally, passes over, or within a haptic-activating area of, a graphical object having an associated haptic effect), the magnitude of the haptic effect is adjusted based on a function of the current velocity of the cursor (which may in some cases be the same as or equivalent to the current velocity of the user object 34 in at least one degree of freedom). Once the magnitude is adjusted, the haptic effect is output and felt by the user (if the magnitude is more than zero magnitude after adjustment). It should be noted that the haptic effect magnitudes are determined in a normal fashion, and then the magnitudes are adjusted or modulated according to the present inventions.

The function that maps cursor/object velocity to haptic effect strength can be any function, such as linear, a higher order polynomial function, step function, discontinuous function, etc. It should be noted that when a strength of a haptic effect is referred to as "zero" herein, this can be implemented in many different ways, including setting a haptic effect to play with a zero magnitude, revoking the command of the haptic effect, stopping the haptic effect, etc.

For example, the graph 300 of FIG. 5a shows a linear proportional mapping of cursor velocity to magnitude (strength, i.e. the force gain) of a haptic effect. The force gain is normalized to a range of zero to one. At the lowest cursor velocities at or near zero, the strength of the haptic effect has a gain of "1" and at the highest velocities, the gaine is close to "0." Between velocities of zero and the highest velocity measurable, the strength of the haptic effect is determined based on predetermined linear curve 302, where higher cursor velocities map to a lower strength effect. Thus, the faster the user moves the user object 34, the more it is assumed that he or she does not want to select nearby graphical objects, and the haptic sensations caused by cursor interactions with those nearby objects are reduced in magnitude. The local processor can perform this haptic effect magnitude change in some embodiments or modes, while the host computer can perform this function in other embodiments or modes.

In the graph 306 of FIG. 5b, a different embodiment shows a step function 308 used for the mapping between effect strength and cursor/user object velocity. At a predetermined range 310 of low velocities from zero to a predetermined velocity threshold V1, the strength of the haptic effect is a first value, for example 100% magnitude, a gain of "1." In a predetermined range 312 of high velocities, from V1 to the highest measured velocity, the strength of the haptic effect is multiplied by a gain of K1 which is less than one. This embodiment is simpler to perform but does not provide the gradual adjustment of effect strength that the embodiment of FIG. 5a does. Alternatively, the strength gain function of FIG. 5b may include more steps than the single step shown in FIG. 5b to achieve a higher resolution effect strength modification based on velocity.

Figure 5C:
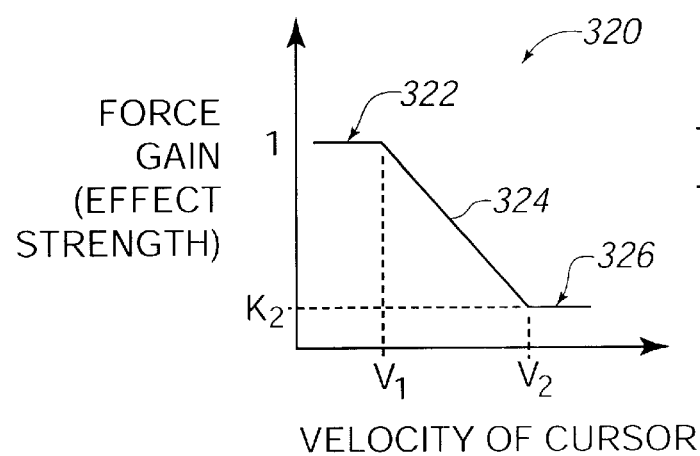

FIG. 5c is a graph 320 illustrating another embodiment of a function that can be used to map cursor or user object velocity to haptic effect strength. For a first section 322 of the described function, at low velocities in the range from zero to a first velocity threshold V1, the gain is at 1, so that the haptic effect strength is normal. In the range of velocities between threshold V1 and a higher threshold V2, the function 324 is used, which linearly maps velocities to magnitude using a linear function. In section 326 of the function, where the range of velocities is above threshold V2, the gain is set to a value K2, which is gain less than 1 and at the level of the low end of the linear function 324. This function thus provides "saturation" regions at the highest and lowest velocities. Velocity thresholds V1 and V2 can be chosen based on which velocities users typically move the user object 34 at when desiring full force strength and minimal force strength. In other embodiments, additional function sections can be included, or discontinuous functions.

By adjusting the strength of a haptic effect in accordance with cursor velocity, the use of beneficial haptic effects can be increased. For example, in a word processing application, a haptic effect associated with every character in a document can be overwhelming for the user, since the cursor can move over many characters in a short space of time. However, by setting a haptic effect strength so that the haptic effects associated with characters are only felt when the cursor is moving slowly over the characters (or are felt at much less magnitude at faster cursor velocities), the user will be given improved feedback on the positioning of the cursor within the document. This is because the user would only typically need to experience the character-associated haptic sensations when moving the cursor slowly on or around those characters to manipulate or navigate through them (for placement of a text cursor, etc.). Similarly, in spreadsheet applications, haptic effects associated with individual cells, or with information within cells, may be output at or near full strength only when the cursor is moving at lower velocities, when the user wishes to manipulate data at the detail level of individual cells.

Some advantageous uses of velocity-modulated strength of haptic effects can be, for example, in selecting graphical objects or items in a graphical environment, in cursor placement within the graphical environment, and in dragging and other similar tasks. When performing selecting tasks, the user may typically reduce the speed of cursor motion to be able to finely move the cursor to a particular graphical object and select it, e.g. text or a cell in a spreadsheet. Since cursor speed is slow for such a task, the stronger haptic sensations output for the slower speeds can aid in selection. Cursor placement tasks also benefit from the modulated haptic effects. When placing a cursor between two words, two characters, or two cells in a spreadsheet, for example, the user moves the cursor slowly, and can benefit from stronger haptic sensations to aid in the cursor placement, e.g. haptic output such as pulses or vibrations informs the user where precisely objects are located in related to the cursor. For example, a pulse that is output at each character haptically informs the user precisely where the cursor is within a word. Finally, dragging and other "analog tasks" which move, modify, or otherwise manipulate graphical objects can benefit from velocity-modified haptic sensations. For example, resizing an object, moving an object, rotating an object, etc., can benefit from haptic effects informing the user of the particular task being performed or aiding in the object manipulation (with textures and/or damping, for example, to make fine motions easier).

Some embodiments can examine the velocity of the cursor in different ways for use in modulating the strength of the haptic effects. For example, the average velocity of the cursor over a predetermined period of time can be examined. Some embodiments may use an absolute cursor velocity in the graphical environment, while others may use the velocity of the cursor between graphical objects, e.g. how fast the cursor is moving between one text word and the next, between one text character and the next, or between one icon and the next encountered icon.

In some embodiments, more than one velocity function may be used. For example, one function can be used at one range of velocities, while a different function can be used for a different range of velocities. Another embodiment can, for example, cater magnitude strength to different motions in different directions or situations. For example, it has been determined that users may have different vertical cursor movement characteristics than horizontal movement characteristics. A first user may use, for example, a horizontal tool bar displayed at the upper portion of a display screen and accordingly would develop a higher velocity routine in navigating the cursor to targets at the top of the screen. Another user may have a vertical toolbar on the side of a screen and accordingly develop a routine of fast horizontal movements. In addition, within an application such as a word processing application or a spreadsheet, vertical and horizontal cursor movements are often at different rates. Thus, the strength of a haptic effect may be a function of a vertical velocity of a cursor and a function of a horizontal velocity of the cursor, where different functions can be associated with horizontal and vertical velocities. For example, considering the velocity threshold ($V_1$) version of FIG. 5b, there may be provided a vertical velocity threshold above which haptic effects are output at a lower strength and a different horizontal velocity threshold above which haptic effects are output at a lower strength. In another version, a linear or other function of vertical velocity may be used to determine a strength component and a linear or other function of horizontal velocity may be used to determine a second strength component. The strength components may be summed or otherwise related or combined to determine the strength of the haptic effect to be output to the user object 34. The multiple velocity functions may be predetermined, may be individually selected by a user, or may be scaled so that a user need only select one velocity function, for example the user may select a scaled value and the vertical velocity threshold and the horizontal velocity threshold are automatically determined and applied during navigation.

Alternatively, the velocity function(s) used can be adaptive to user motion, e.g. determined on the fly by analyzing user motion for a period of time. Functions may also be determined based on other factors or characteristics. For example, average user velocities, past user velocities, areas on the screen where the cursor often is positioned, the extent of the screen which the user moves the cursor to, the application program being used, etc., may each or all be useful in determining a function that is best suited to the user and/or to the program or environment being used.

In another version, different velocity functions may be associated with different haptic effects and/or with different targets. For example, if a haptic effect of a vibration is associated with an icon and a haptic effect of a pop or pulse is associated with a character in a word processing application, different velocity thresholds may be desirable for modulating the strengths of the respective effects. A user may be able to target an icon at a higher velocity than the user can target an area between two characters. Accordingly, the icon effect velocity threshold may desirably be greater than the character effect velocity threshold. As a result, above a upper velocity threshold, both haptic effects would be output at a low strength, such as a gain of "0", and below a lower velocity threshold, both haptic effects would be output at a higher strength, such as at a gain of "1", and at an intermediate velocity between the upper and lower thresholds, the character effect may be output at a low strength and the icon effect may be output at a higher strength.

In some embodiments, different thresholds or functions can be used for different targeting tasks in the graphical environment. For example, in one embodiment, for a selection task as described above, a function having a lower velocity threshold can be used, allowing greater strength haptic effects to be output for more velocities. Since, in many embodiments, the user is pressing a button or performing some other command gesture during selection, it is known whether selection is taking place and thus haptic effects can be output more strongly. With a cursor placement task, a function having a higher velocity threshold can be used to allow only very slow movements to cause full strength haptic effects, since it may not be known whether the user desires to place a cursor with fine motion, or is simply moving the cursor around with coarse motion (in the latter case, haptic effects may not be desired). Dragging objects, resizing objects, and other "analog tasks" can use different functions than other tasks, if desired.

The use of velocity as a modulator for haptic effects and, in effect, to help determine the user's volition in cursor navigation, is advantageous when selecting and highlighting text or cells in word processing or spreadsheet applications. For example, when it is desirable to highlight only a few words in a word processing application or a few cells in a spreadsheet program, strong haptic effects are desirable to enhance the user's ability to accurately select the intended words or cells. However, when highlighting several pages of text or several rows or columns of cells, it is less necessary to have haptic feedback for fine cursor movements. Since the cursor is typically moved at a higher velocity when highlighting large areas, the velocity filters of FIGS. 5a, 5b and 5c and those discussed above are advantageous.

Object Density for Use in Modulating Effect Strength

Other characteristics of the graphical environment may also be used to adjust haptic effect strength. For example, the cursor may encounter a large number of graphical objects when moving across the screen even if the cursor velocity is low, if there is a high density of graphical objects. For instance, small characters in a word or a large number of small icons on a crowded desktop screen may undesirably cause lots of haptic effects to be output if the user moves the cursor relatively slowly across all these objects. Therefore, velocity alone may not in some circumstances provide a good indication of when to reduce strength of haptic effects associated with objects, since the same cursor velocity may in one case call for higher strength effects, while in different case of higher numbers of graphical objects, or more closely-spaced graphical objects, call for lower strength haptic effects. In addition, in some embodiments, velocity determination may be too coarse, e.g. velocity may not be able to be measured with sufficient accuracy to provide helpful haptic effects.

One embodiment of the present inventions can look at the rate that the cursor encounters or interacts with graphical objects (e.g. moves over or within the haptic-activating area), which is indicative of the density of the graphical objects, to help determine whether haptic effect strength should be reduced to aid navigation of the graphical environment. For example, as the cursor is moved across several graphical objects, a count of the objects can be made within a predetermined period of time. If it is determined that a large number of graphical objects (e.g. over a predetermined threshold number of objects) are being encountered by the cursor in that period of time, the haptic effect strength can be reduced. The strength reduction can be performed according to a function similar to those functions of FIGS. 5a–5c or others discussed above, but having a horizontal axis based on the count of graphical objects encountered by the cursor rather than velocity of the cursor, where a higher object count reduces the haptic effect strength. Other methods can also be used to determine object density. For example, the time elapsed when the cursor is moved between two graphical objects can be measured for modulating haptic effect strength. Once a cursor leaves one object, a timer measures the time until the cursor enters another object; the length of time can determine effect strength modulation according to a predetermined function. In some embodiments, short time durations between objects indicates high object density and may cause haptic effect strength to be reduced so that the user is not overwhelmed with many haptic effects all at once; longer times between objects may allow the haptic effects to be output at high or full strength.

These graphical object density determinations can also be made in conjunction with the velocity determination referred to for the embodiments of FIGS. 5a–5c and similar embodiments, where both graphical object density and cursor velocity can be used to find the most appropriate strength for haptic effects. For example, if a low velocity is measured but a high object density is found, the haptic effect strength can be reduced, and if a high velocity is measured, the haptic effect strength can be reduced without even having to look at graphical object density. The adaptive functions and other features described above can also be used in conjunction object density determination where appropriate.

Haptic Effects as a Function of Engagement Duration

Navigation of a graphic image in a graphical environment may alternatively or additionally be enhanced by outputting a haptic effect having a strength based on or that is a function of the time duration of cursor engagement (i.e., interaction) with a target. For example, a target that has an associated haptic effect, such as an attractive or spring force, can assist the user in positioning the cursor over the target when the user is navigating the cursor to the target. However, that haptic effect (or any haptic effect output upon exit of the cursor from the target) may discourage or fight against movement of the cursor away from the target when the user is moving the cursor to a different target. It has been determined that the exiting haptic effect can be enhanced by making the strength or duration of the effect a function of the amount of time the cursor is engaged with the target (e.g., positioned over the target). In one version, the strength of the haptic effect is at least partially inversely proportional to the amount of time. Accordingly, when a cursor is positioned over a target for a longer amount of time, a smaller-strength haptic effect will be output when the user directs the cursor away from the target.

Figure 6A:
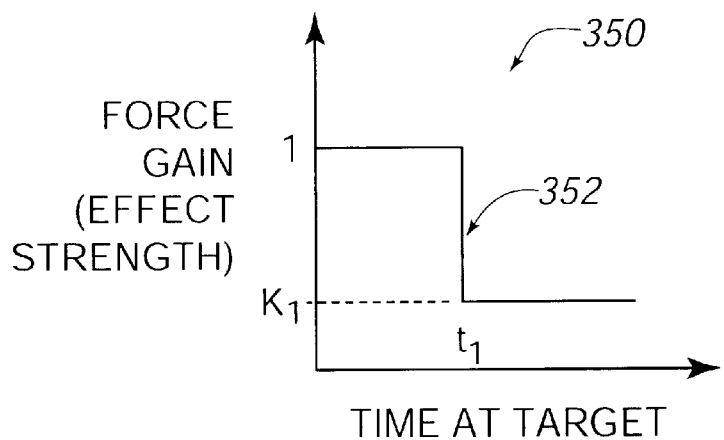
FIGS. 6a and 6b are graphs illustrating different embodiments of functions used to provide a strength of haptic effect based on an engagement duration of the cursor with a target.

In one embodiment of the invention, a time threshold ($t_1$) is predetermined. FIG. 6a is a graph 350 illustrating one embodiment of providing a time threshold, where the horizontal axis indicates the time the cursor is at or engaged with the target, and the vertical axis indicates the strength of the associated haptic effect(s), or normalized force gain. Function 352 indicates that at those amounts of time below the time threshold t1, an exiting haptic effect is output at a first strength, here shown as a gain of "1" (normal strength), and at those times above the time threshold t1, the exiting haptic effect can be output at a second strength, here shown as a gain k1 that is less than "1," for example "0" to turn off the haptic effect entirely, or any fraction of 1 to reduce the strength of the effect. Thus, the haptic effect does not interfere with the user moving the cursor away from the target, since time t1 is close enough to the time of engagement so that the haptic effect is turned off or reduced in strength typically before the user can move the cursor away. The amount of time at a target may be determined by the host computer 12 or by the local processor 26. Time threshold t1, in one example, can be about 100–200 ms, but may be different time spans in different embodiments or for different graphical objects, tasks, haptic effects, etc. Alternatively, the function shown in FIG. 6a may be provided with additional steps or may be a linear or higher order function.

Figure 6B:
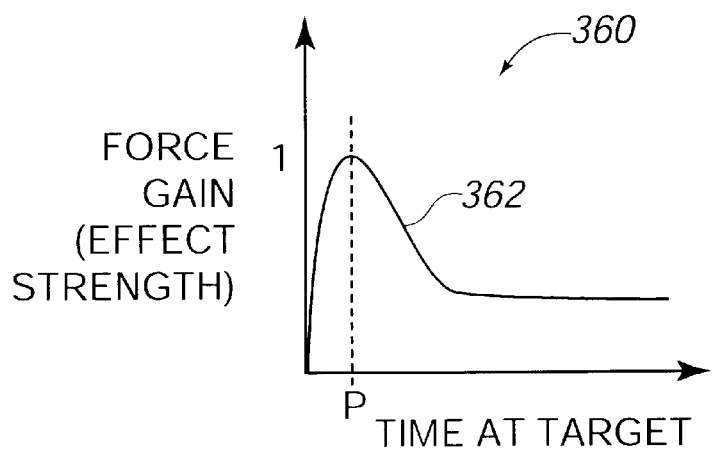

FIG. 6b is a graph 360 illustrating a different function 362 for use with engagement duration. The effect strength rises rapidly at low time amounts, tapers off at peak time P, and then gradually drops to lower effect strengths at larger time amounts. This version is advantageous in that exiting haptic effects are not as reduced in strength soon after the cursor engages the target, but only gradually reduces effect strength, thereby reducing the amount of overshooting of a target during navigation. Accordingly, a user can direct a cursor toward a target with less precision and with less concentration than if the user must carefully position the cursor over the target and stop the cursor thereon.

In some embodiments, the timer that starts the counting of time of engagement can start only after any haptic effects output upon initial engagement have subsided. For example, when a cursor first encounters a target, a haptic effect may be output, such as a pulse or vibration. It may in some cases be a more compelling experience to the user for the method to wait until the initial output effect has finished playing before starting the count of time of engagement, even though this may be after the actual time of engagement. For haptic effects that have no duration, such as an attractive force that always attracts the cursor to a target, the timer can begin counting immediately upon engagement of the target by the cursor.

In other embodiments, the strength of the associated haptic effect(s) can be based on other durations instead of cursor engagement duration. For example, one embodiment can provide haptic effect strength as a function of the amount of time the cursor is not moving (e.g. after being positioned at a target).

Using engagement time (and times of other cursor activity) to modulate the strength of a haptic effect is also valuable for haptic effects that are applied within a target. For example, if a vibration is applied to indicate positioning over a target, modulating the effect strength over time will lessen or remove the haptic effect when it is not needed. This modulation also allows for the application of additional haptic effects within the target without overloading the user with different effects.

As with the velocity-dependent effects, the time-dependent effects may have multiple time-dependent functions. For example, one target may have a first time threshold and a second target may have a second time threshold; or a single target may have different time thresholds and/or functions, dynamically determined based on past cursor movement by the user or other events or characteristics of the graphical environment. Or, different cursor navigation tasks can use different functions, e.g. for selecting, placement, dragging, etc.

Although the present invention has been described in considerable detail with regard to certain preferred versions thereof, other versions are possible, as discussed above. Thus, alterations, permutations and equivalents will become apparent to those skilled in the art upon a reading of the specification and study of the drawings. Also, the various features of the embodiments herein can be combined in various ways to provide additional embodiments of the present invention. Furthermore, certain terminology has been used for the purposes of descriptive clarity, and not to limit the present invention. Therefore, the appended claims should not be limited to the description of the preferred versions contained herein and should include all such alterations, permutations, and equivalents as fall within the true spirit and scope of the present invention.

What is claimed is:

1. A method, comprising
   determining a velocity of a cursor in a graphical environment; and
   outputting a signal for rendering a haptic effect, a magnitude of the haptic effect related to the velocity of the cursor by an inverse function.

2. The method as recited in claim 1 further comprising adjusting the magnitude of the haptic effect by a constant gain, if the velocity of the cursor is less than a threshold value.

3. A method as recited in claim 1 further comprising moving a graphical object in the graphical environment using the cursor.

4. A method as recited in claim 1 further comprising rotating a graphical object in the graphical environment using the cursor.

5. A method as recited in claim 1 further comprising re-sizing a graphical object in the graphical environment using the cursor.

6. A method as recited in claim 1 manipulating the cursor with a user-manipulable object.

7. A method as recited in claim 6 further comprising outputting the haptic effect to said user-manipulable object.

8. A method, comprising:
   determining a density of objects encountered by a cursor in a graphical environment;
   outputting a signal for rendering a haptic effect, a magnitude of the haptic effect related to the density of objects.

9. A method as recited in claim 8 further comprising selecting a predetermined function to relate the magnitude of the haptic effect to the density of objects.

10. A method as recited in claim 9 wherein the predetermined function includes that the magnitude of the haptic effect increases as the density of objects decreases.

11. A method as recited in claim 10 wherein the predetermined function is one of an inverse function and a step function.

12. A method as recited in claim 8 further comprising determining a velocity of the cursor in the graphical environment, and adjusting the magnitude of the haptic effect based on the velocity determination.

13. A method as recited claim 8 wherein the determination of the density of objects includes counting a number of graphical objects encountered by the cursor in a predetermined period of time.

14. A method as recited claim 8 wherein the determination of the density of objects is based on a time elapsed between the cursor exiting one graphical object and entering another graphical object.

15. A method, comprising:
    determining an engagement duration of a cursor with a graphical object in a graphical environment; and
    outputting a signal for rendering a haptic effect, a magnitude of the haptic effect decreasing with the engagement duration.

16. A method as recited in claim 15 wherein the magnitude of the haptic effect is related to the engagement duration by one of an inverse function and a step function.

17. A computer-readable medium on which is encoded computer program code comprising:
    program code to determine a velocity of a cursor in a graphical environment; and
    program code to output a signal for rendering a haptic effect, a magnitude of the haptic effect related to the velocity of the cursor by in inverse function.

18. A computer-readable medium on which is encoded computer program code comprising:
    program code to determine a density of objects encountered by a cursor in a graphical environment; and
    program code to output a signal for rendering a haptic effect, a magnitude of the haptic effect related to the density of objects.

19. A computer-redable medium as recited in claim 18 further comprising program code to select a predetermined function to relate the magnitude of the haptic effect to the density of objects.

20. A computer-readable medium as recited in claim 19 wherein the predetermined function includes that the magnitude of the haptic effect increases as the density of objects decreases.

21. A computer-readable medium as recited in claim 20 wherein the predetermined function is one of an inverse function and a step function.

22. A computer-readable medium as recited in claim 18, further comprising:
    program code to determine a velocity of the cursor in the graphical environment; and
    program code to adjust the magnitude of the haptic effect based on the velocity determination.

23. An apparatus, comprising:
    a user-manipulable object, capable of manipulating a cursor in a graphical environment;

a haptic-effect actuator, coupled to said user-manipulable object;

a processor, in communication with the haptic-effect actuator; and a memory storing code to be executable by said processor, including:

code to determine a velocity of the cursor in the graphical environment; and code to output a haptic-rendering signal;

said haptic-effect actuator configured to receive the haptic-rendering signal and output a haptic effect to the user-manipulable object, a magnitude of the haptic effect related to the velocity of the cursor by an inverse function.

24. An apparatus, comprising:

a user-manipulable object;

a haptic-effect actuator, coupled to the user-manipulable object;

a processor, in communication with said haptic-effect actuator; and a memory storing code to be executable by said processor, including:

code to determine density a density of objects encountered by a cursor in a graphical environment; and code to output a haptic-rendering signal;

said haptic-effect actuator configured to receive the haptic-rendering signal and output a haptic effect to the user-manipulable object, a magnitude of the haptic effect related to the density of objects.

25. An apparatus as recited claim 24 wherein said memory further comprises code to select a predetermined function to relate the magnitude of the haptic effect to the density of objects.

26. An apparatus as recited claim 25 wherein the predetermined function entails that the magnitude of the haptic effect increases as the density of objects decreases.

27. A method, comprising determining a velocity of a cursor in a graphical environment; and outputting a signal for rendering a haptic effect, a magnitude of the haptic effect related to the velocity of the cursor by a step function.

* * * * *

UNITED STATES PATENT AND TRADEMARK OFFICE
CERTIFICATE OF CORRECTION

PATENT NO. : 6,750,877 B2
DATED : June 15, 2004
INVENTOR(S) : Louis B. Rosenberg et al.

It is certified that error appears in the above-identified patent and that said Letters Patent is hereby corrected as shown below:

Column 23,
Line 61, that portion reading "6. A method as recited in claim 1 manipulating the cursor" should read -- 6. A method as recited in claim 1 further comprising manipulating the cursor --.

Column 24,
Line 17, that portion reading "13. A method as recited claim 8 wherein the determination" should read -- 13. A method as recited in claim 8 wherein the determination --
Line 21, that portion reading "14. A method as recited claim 8 wherein the determination" should read -- 14. A method as recited in claim 8 wherein the determination --.
Line 48, that portion reading "19. A computer-redable medium as recited in claim 18" should read -- 19. A computer-readable medium as recited in claim 18 --.

Signed and Sealed this

Twenty-first Day of December, 2004

JON W. DUDAS
*Director of the United States Patent and Trademark Office*